(12) United States Patent
Settle

(10) Patent No.: US 10,467,083 B2
(45) Date of Patent: Nov. 5, 2019

(54) EVENT RELATIONSHIP ANALYSIS IN FAULT MANAGEMENT

(71) Applicant: INTERNATIONAL BUSINESS MACHINES CORPORATION, Armonk, NY (US)

(72) Inventor: Jonathan I. Settle, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 15/617,564

(22) Filed: Jun. 8, 2017

(65) Prior Publication Data

US 2018/0357116 A1 Dec. 13, 2018

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0781* (2013.01)

(58) Field of Classification Search
CPC ............ G06F 11/0751; G06F 11/0793; G06F 11/3006; G06F 11/3058; G05B 23/024
See application file for complete search history.

(56) References Cited

U.S. PATENT DOCUMENTS

| | | | | |
|---|---|---|---|---|
| 5,483,637 A * | 1/1996 | Winokur | ................. | H04L 43/00 714/26 |
| 5,619,621 A * | 4/1997 | Puckett | ............... | G06F 11/2257 706/45 |
| 5,848,143 A * | 12/1998 | Andrews | ............... | H04M 3/493 379/265.09 |
| 6,023,507 A * | 2/2000 | Wookey | .............. | G06F 11/2294 380/285 |
| 6,529,954 B1 * | 3/2003 | Cookmeyer, II | ........ | H04L 41/16 706/47 |
| 6,697,791 B2 | 2/2004 | Hellerstein et al. | | |

(Continued)

FOREIGN PATENT DOCUMENTS

| | | |
|---|---|---|
| CN | 1529455 A | 9/2004 |
| CN | 100456687 C | 1/2009 |

(Continued)

OTHER PUBLICATIONS

Berberidis et al., "Inter-Transaction Association Rules Mining for Rare Events Prediction," Department of Informatics, Aristotle University of Thessaloniki, Thessaloniki, Greece, Jan. 2004, 10 pages.

(Continued)

*Primary Examiner* — Bryce P Bonzo
*Assistant Examiner* — Jeison C Arcos
(74) *Attorney, Agent, or Firm* — Richard A. Wihelm

(57) ABSTRACT

Method and system for event relationship analysis in fault management. The method includes identifying a group of related events based on a history of a plurality of event instances relating to multiple events. For each event occurrence of each event of the group of related events, there is identified: an event type; and one or more resources associated with the event occurrence. The method also comprises: identifying a set of event occurrences of the same type; and identifying event occurrences associated with the same resource.

8 Claims, 10 Drawing Sheets

(56) References Cited

U.S. PATENT DOCUMENTS

| | | | | |
|---|---|---|---|---|
| 6,738,811 | B1* | 5/2004 | Liang | H04L 41/147 709/224 |
| 6,941,247 | B2* | 9/2005 | Voigt | G05B 15/02 700/3 |
| 7,003,779 | B2* | 2/2006 | Riosa | H04L 41/065 709/223 |
| 7,277,783 | B2* | 10/2007 | Predelli | G05B 19/0421 701/48 |
| 7,500,142 | B1* | 3/2009 | Cowart | H04L 41/065 702/183 |
| 7,631,058 | B2 | 12/2009 | Grabamik et al. | |
| 8,176,527 | B1 | 5/2012 | Njemanze et al. | |
| 8,224,761 | B1 | 7/2012 | Rockwood | |
| 8,453,165 | B2 | 5/2013 | McKinney | |
| 8,484,514 | B2 | 7/2013 | Tonouchi | |
| 8,626,894 | B2 | 1/2014 | Chen et al. | |
| 9,021,304 | B2 | 4/2015 | Tonouchi | |
| 9,282,114 | B1 | 3/2016 | Dotan et al. | |
| 9,990,397 | B2 | 6/2018 | Victor | |
| 2003/0149919 | A1* | 8/2003 | Greenwald | G06F 11/2257 714/43 |
| 2004/0225381 | A1* | 11/2004 | Ritz | G06F 11/0709 700/26 |
| 2004/0236820 | A1* | 11/2004 | Flocken | G06F 11/0709 709/200 |
| 2006/0036670 | A1* | 2/2006 | Musman | H04L 41/044 709/202 |
| 2006/0242286 | A1* | 10/2006 | Hawkins | G06F 11/0709 709/223 |
| 2008/0010047 | A1 | 1/2008 | Graf et al. | |
| 2008/0082657 | A1* | 4/2008 | Hart | H04L 41/0681 709/224 |
| 2008/0162592 | A1* | 7/2008 | Huang | G06F 11/3476 |
| 2009/0187521 | A1* | 7/2009 | Lake | G06N 7/02 706/21 |
| 2009/0271232 | A1* | 10/2009 | Waguet | G06Q 10/06 705/7.36 |
| 2010/0100775 | A1* | 4/2010 | Slutsman | G06F 11/079 714/47.2 |
| 2010/0318856 | A1* | 12/2010 | Yoshida | G05B 23/024 714/47.1 |
| 2011/0119219 | A1* | 5/2011 | Naifeh | H04L 41/0604 706/47 |
| 2012/0102371 | A1* | 4/2012 | Tonouchi | G05B 23/0275 714/49 |
| 2012/0266020 | A1* | 10/2012 | Souvannarath | G06F 11/0709 714/26 |
| 2013/0042147 | A1* | 2/2013 | Tonouchi | G06F 11/0781 714/37 |
| 2013/0179793 | A1 | 7/2013 | Duggan et al. | |
| 2014/0019795 | A1* | 1/2014 | Sonoda | G06F 11/0751 714/2 |
| 2014/0237297 | A1 | 8/2014 | Nagura et al. | |
| 2015/0058449 | A1 | 2/2015 | Garg et al. | |
| 2016/0239543 | A1 | 8/2016 | Victor | |
| 2017/0063907 | A1* | 3/2017 | Muddu | G06F 16/254 |
| 2017/0111245 | A1 | 4/2017 | Ishakian et al. | |
| 2017/0132306 | A1* | 5/2017 | Brew | G06F 16/285 |
| 2017/0168882 | A1* | 6/2017 | Brew | G06F 11/079 |
| 2017/0235623 | A1* | 8/2017 | Brew | G06F 11/079 714/37 |
| 2017/0302685 | A1* | 10/2017 | Ladnai | H04L 63/1416 |

FOREIGN PATENT DOCUMENTS

| | | |
|---|---|---|
| CN | 101888309 A | 11/2010 |
| CN | 101888309 B | 7/2012 |

OTHER PUBLICATIONS

Cule et al., "MARBLES: Mining Association Rules Buried in Long Event Sequences," Department of Mathematics and Computer Science, University of Antwerp, 2012, 12 pages.

Schiefer et al., "Correlating Business Events for Event-Triggered Rules," G. Govematori, J. Hall, and A. Paschke (Eds.): RuleML 2009, LNCS 5858, pp. 67-81, Copyright Springer-Verlag Berlin Heidelberg 2009.

Vilalta et al., "Predicting Rare Events in Temporal Domains," Proceedings of the 2002 IEEE International Conference on Data Mining, pp. 474-481, Copyright 2002 IEEE.

Mell et al., "The NIST Definition of Cloud Computing," National Institute of Standards and Technology, U.S. Department of Commerce, Special Publication 800-145, Sep. 2011, 7 pages.

Thoenen et al., "Event Relationship Networks: A Framework for Action Oriented Analysis in Event Management", IBM Research Report—Computer Science, RC 21843 (98313), Sep. 28, 2000 (17 pages).

Teufl et al., "Event Correlation on the basis of Activation Patterns", 2010 18th Euromicro Conference on Parallel, Distributed and Network-based Processing, pp. 631-640.

Bradmark Technologies, "Surveillance Proactive Alert Notification", printed on May 3, 2017, pp. 1-2, http://www.bradmark.com/products/survEventManagement.html.

* cited by examiner

EVENT RELATIONSHIP ANALYSIS IN FAULT MANAGEMENT

BACKGROUND

The present invention relates to event relationship analysis in fault management.

Data center and network management disciplines have focused on fault and root cause analysis processes, tools and best practices. When events occur in a data center, a notification is sent to an event manager. At the event manager, the event may be de-duplicated, correlated, and enriched. It may be handled via a policy enforced by a rules engine. It may be used to automatically create a ticket for a help desk. To reduce operation cost, it is known to correlate commonly co-occurring alerts together so as to allow an operator to only work on one problem or one ticket open for a single problem.

Event manager products may implement concepts for identifying recurrent patterns in an event stream so that when operators are presented with a set of incoming events the list may be compacted using previously-observed relationships. Such identification of event patterns may not be trivial and typically provides limited information. By way of example, identified patterns may be resource specific (e.g. 'resource bound') and/or require an event to occur multiple times in order for a pattern to be identified.

BRIEF SUMMARY

Additional aspects and/or advantages will be set forth in part in the description which follows and, in part, will be apparent from the description, or may be learned by practice of the invention.

The present invention seeks to provide a method for event relationship analysis in fault management.

The present invention further seeks to provide a computer program product including computer program code for implementing the method when executed on a processor of a processing system.

The present invention yet further seeks to provide a processing system adapted to execute this computer program code.

The present invention also seeks to provide a system for event relationship analysis in fault management.

According to an embodiment of the present invention there is provided a computer-implemented method for event relationship analysis in fault management. The method comprises identifying a group of related events based on a history of a plurality of event instances relating to multiple events. For each event occurrence of each event of the group of related events, an event type and one or more resources associated with the event occurrence are identified. A first set of event occurrences of the group of related events is identified so that each event occurrence of the set is of the same event type. The method further comprises identifying a first group of event occurrences of the first set of event occurrences, each event occurrence of the first group being associated with the same resource. An advantage of this embodiment may provide concepts automatically suggesting groups or rules, thus potentially enabling the construction of correlation rules for event management even if the event management system has never seen an event for the system before.

According to another embodiment of the present invention there is provided a computer-implemented method for event relationship analysis in fault management. The method comprises identifying a group of related events based on a history of a plurality of event instances relating to multiple events. For each event occurrence of each event of the group of related events, an event type and one or more resources associated with the event occurrence are identified. A first group of event occurrences of the group of related events is identified so that each event occurrence of the first group is associated with the same resource. The method further comprises identifying a first set of event occurrences of the first group of event occurrences, each event occurrence of the set being of the same event type. An advantage of this embodiment may be identifying a primary key for event, event time, event type, and one or more fields indicating associated resources.

According to another embodiment of the present invention, there is provided a computer program product for event relationship analysis in fault management. The computer program product comprises a computer readable storage medium having program instructions embodied therewith, the program instructions executable by a processing unit to cause the processing unit to perform a method according to an embodiment of the invention. An advantage of this embodiment may provide concepts automatically suggesting groups or rules, thus potentially enabling the construction of correlation rules for event management even if the event management system has never seen an event for the system before.

According to yet another aspect of the invention, there is provided a system for event relationship analysis in fault management. The system comprises: a memory; and a processor communicatively coupled to the memory. The system is adapted to perform a method comprising: identifying a group of related events based on a history of a plurality of event instances relating to multiple events; for each event occurrence of each event of the group of related events, identifying: an event type; and one or more resources associated with the event occurrence; identifying a first set of event occurrences of the group of related events, each event occurrence of the set being of the same event type; and identifying a first group of event occurrences of the first set of event occurrences, each event occurrence of the first group being associated with the same resource. An advantage of this embodiment may be identifying a primary key for event, event time, event type, and one or more fields indicating associated resources.

BRIEF DESCRIPTION OF THE DRAWINGS

The above and other aspects, features, and advantages of certain exemplary embodiments of the present invention will be more apparent from the following description taken in conjunction with the accompanying drawings, in which.

Figure 1A:
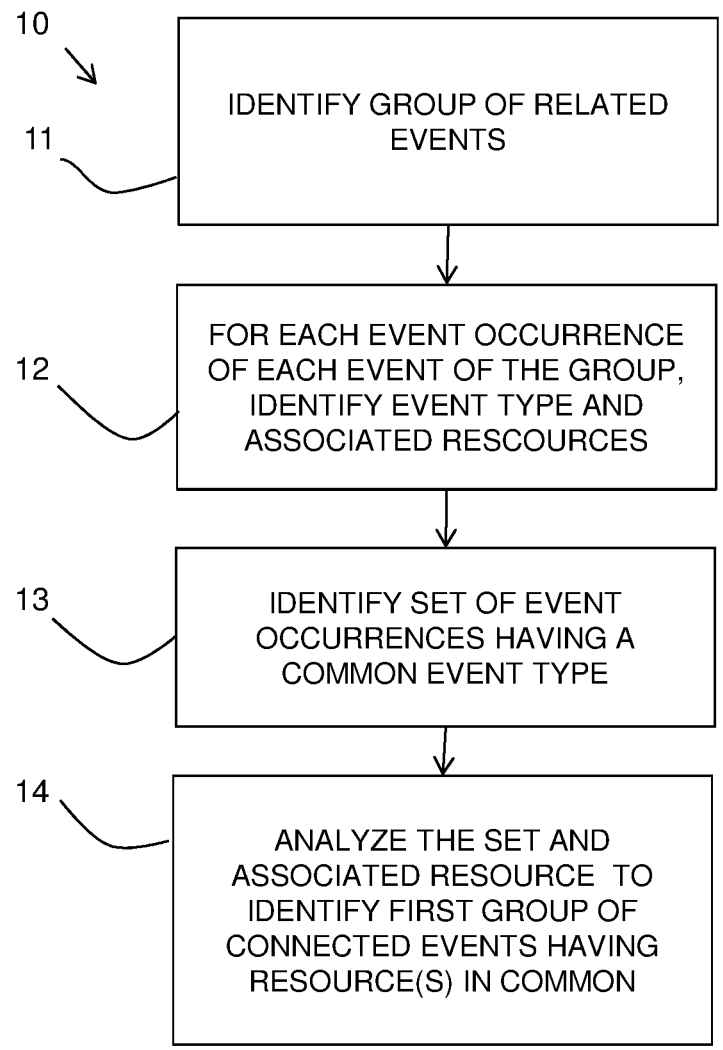
FIG. 1A is a flow diagram of an example embodiment of a method, in accordance with one or more aspects of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The present application discloses identifying a group of connected events of the same event type and having one or more associated resources in common. Embodiments may thus be used for identifying patterns in event data. Identified patterns that are resource specific (i.e. resource bound), and may also have the drawback that they can only be used in relation to events that have previously occurred a plurality of times. The present application may provide concepts for automatically suggesting groups or rules, thus potentially enabling the construction of correlation rules for event management even if the event management system has never seen an event for that system before.

The disclosed embodiments may therefore relate to discovering relationships between events in an event management system that may be used for fault management. In the disclosed embodiments, a group of related events may be identified based on a history of a plurality of event instances relating to multiple events. This may, for example, employ an approach or concept for identifying a group of related events. Then, for each event occurrence of each event of the group of related events, there may be identified an event type, and one or more resources associated with the event occurrence. Using such information, a pattern or collections of event occurrences of the same event type and using the same resource may be identified.

Embodiments may be adapted to cater for poorly structured and/or varied data/information schemas that lack consistency or standardization in how event information (such as a description of event type and associated resources) is organized, stored and/or presented. Such a lack of standard information structure is typically resultant from the use of differing software tooling and/or differing monitoring rules. Embodiment may propose to address this issue by identifying a primary key (e.g. identifier) for event, event time, event type, and one or more fields indicating associated resources.

By way of example, an embodiment may identify a group of related events based and automatically compute patterns (e.g. sets of event occurrences of the group) having a common event type. The pattern(s) may, for example, comprise, for each event occurrence, an event type (e.g. in one column or data field), and one or more resources associated with the event occurrence (e.g. in one or more respective columns or data fields). From the pattern(s), there may then be identified a group of connected events of the same event type and having one or more associated resources in common. Thus, the various columns or data fields may be analyzed so as to cater for variations in how and/or where information about resources associated with an event occurrence are presented or formatted. In doing so, the column or data field comprising the highest number/count of a resource may be selected (e.g. on the basis that it the most used or reliable source of information for defining a set of connected events).

Embodiments may offer automatic creation of correlation rules from a group of events that have been identified using an unsupervised learning algorithm. Such creation may be achieved in various ways. For example, in one approach, the group of related events may be analyzed to identify a set of event occurrences of the same event type, and then from this set there may be identified a group of event occurrences using the same resource. Alternatively, in another approach, the group of related events may be analyzed to identify a group of event occurrences using the same resource, and then from this group there may be identified a set of event occurrences of the same event type. Thus, it will be appreciated that event types may be analyzed first or, alternatively, resources may be analyzed first.

Also, embodiments may be implemented in a manner which caters for diversity in how information about event occurrence and their associated resources may be stored and/or provided. Accordingly, there may be provided an approach for event relationship analysis in fault management which takes account of standardization issues (e.g. lack of a standard data format or presentation).

Illustrative embodiments may therefore provide concepts for analyzing event relationships in an event management system and for providing correlation rules based on such analysis. Dynamic and/or flexible correlation rules construction concepts may therefore be provided by proposed embodiments.

Modifications and additional steps to an event/fault management concepts and/or systems may also be proposed which may enhance the value and utility of the disclosed invention.

Referring to FIG. 1A, there is depicted a flow diagram of a method 10 for event relationship analysis in fault management according to an embodiment.

The method 10 begins with step 11 of identifying a group of related events based on a history of a plurality of event instances relating to multiple events. Numerous method and/or approaches for identifying a group of related events may, for example, comprise an unsupervised learning algorithm. Detailed description of the step 11 of identifying a group of related events based on a history of a plurality of event instances relating to multiple events will be described later/below with reference to FIGS. 2-4.

Next, in step 12, for each event occurrence of each event of the group of related events, there is identified: an event type; and one or more resources associated with the event occurrence. In this way, there may be provided one or more pattern which, for example, comprise, for each event occurrence, an event type (e.g. in a column or data field); and one or more resources associated with the event occurrence (e.g. in one or more respective columns or data fields).

Event occurrences having the same type may then be grouped together in step 13. For example, the patterns provided by step 12 may be analyzed to identify a set of event occurrences of the group having a common event type. In other words, a set of event occurrences may be identified, wherein each member (i.e. event occurrence) of the set has the same event type. The identified set of event occurrences of the same event type are then analyzed in step 14 along with their associated resources to identify events which have (e.g. are associated with) the same resource(s). These identified resources are grouped together so as to provide a first group of connected events, wherein the connected events employ common resources.

By way of example, the step 14 of analyzing the identified set of event occurrences of the same type may comprise the process of identifying an event occurrence that does not have an associated resource in common with the one or more resources associated with the remaining event occurrences of the set of event occurrences. If such an event occurrence which doesn't have a resource that matches with the remaining event occurrences of the set is found, that event occurrence may be removed from the set. In this way, event occurrences that are not connected with other event occurrences of the set may be discarded so as to leave only events have matching resources. An amount of further processing required to identify a group of connected event may thus be reduced.

For example, such further processing may be required if the resources associated with each event occurrence are represented by information provided in a plurality of data fields. This may be the case where poorly structured and/or varied data/information schemas that lack consistency or standardization in how event information (such as a description of event type and associated resources) is organized, stored and/or presented. Accordingly, to cater for this situation where resource information is provided across multiple data fields or data columns, the step 14 of analyzing the set of event occurrences and the one or more resources associated with the event occurrences may comprise the sub-steps of: identifying a resource that is associated with all event occurrences of the set; analyzing the information provided in the plurality of data fields to identify a data field containing the most instances of the identified resource; and identifying a group of connected events having the common event type based on the identified resource and the identified data field. Put another way, set of event occurrences may be analyzed to identify a primary key (e.g. identifier) for event, event time, event type, and one or more fields indicating associated resources.

It is noted here that the method 10 may repeat the step 14 of analyzing the set of event occurrences and the one or more resources associated with the event occurrences of the set so as to identify a second group of connected events having one or more associated resources in common. In this way, embodiments of the method 10 may identify a plurality of groups of connected events (employing common resources). These groups may then be combined to create a parent (or 'super') group of related events having the same event type (because they all stemmed from the identified set of event occurrence having a common event type identified in step 13 for example).

Figure 1B:
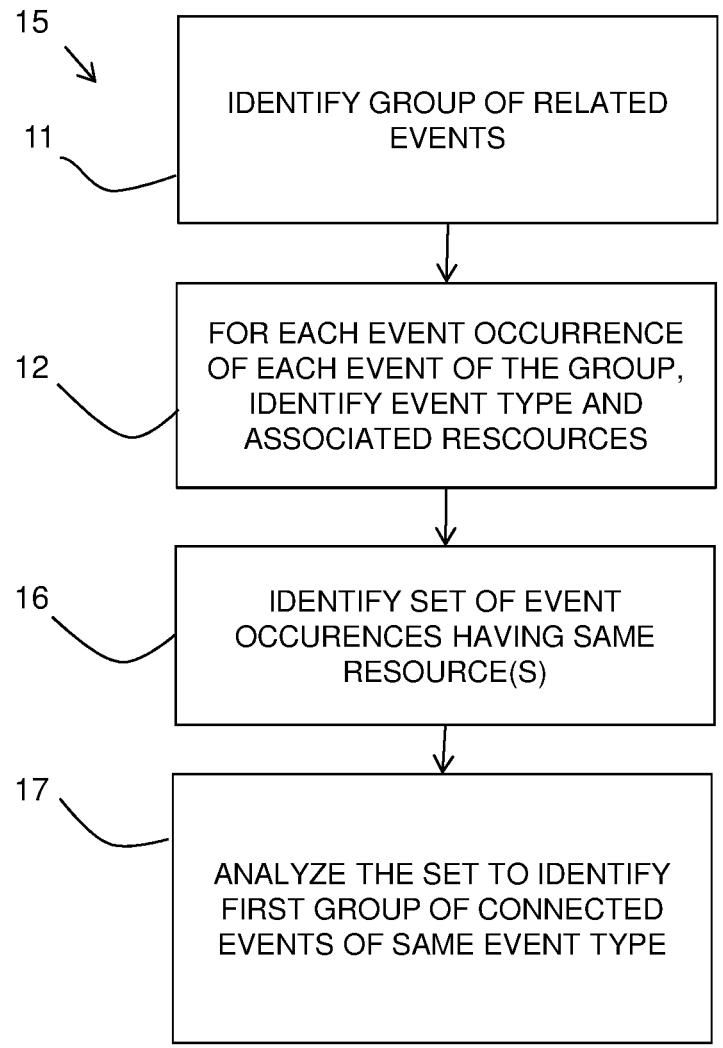
FIG. 1B is a flow diagram of another example embodiment of a method, in accordance with one or more aspects of the present invention.

Referring to FIG. 1B, there is depicted a flow diagram of a method 15 for event relationship analysis in fault management according to an alternative embodiment. This embodiment differs from that of FIG. 1A in that the order of the final two steps are is swapped (i.e. completed in the reverse or opposite order). Thus, in summary, rather than first identifying a set of event occurrences of the same event type (step 13) and then identifying, from that set, a group of events having the same resource(s) (step 14), the embodiment of FIG. 1B first identifies a group of event occurrences having the same resource(s) (step 16) and then identifies, from that group, a set of events of the same event type (step 17).

As with the method 10 of FIG. 1A, the method 15 of FIG. 1B begins with step 11 of identifying a group of related events based on a history of a plurality of event instances relating to multiple events. Numerous method and/or approaches for identifying a group of related events based on a history of a plurality of event instances relating to multiple events will be described later/below with reference to FIGS. 2-4.

Next, in step 12, for each event occurrence of each event of the group of related events, there is identified: an event type; and one or more resources associated with the event occurrence. In this way, there may be provided one or more patterns which, for example, comprise, for each event occurrence, an event type (e.g. in a column or data field); and one or more resources associated with the event occurrence (e.g. in one or more respective columns or data fields).

Event occurrences having the same resource may then be grouped together in step 16. For example, the patterns provided by step 12 may be analyzed to identify a set of event occurrences of the group having the same resource. In other words, a set of event occurrences may be identified, wherein each member (i.e. event occurrence) of the set has the same associated resource. The identified set of event occurrences associated with the same resource are then analyzed in step 17 along with the information about their event type to identify events which are of the same event type. These identified resources are grouped together so as to provide a first group of connected events, wherein the connected events are of the same event type and employ the same resource.

By way of example, the step 17 of analyzing the identified set of event occurrences associated with the same resource may comprise the process of identifying an event occurrence that is not of an event type in common with the one or more event type of the remaining event occurrences of the set of event occurrences. If such an event occurrence which is not of an event type that matches with the remaining event occurrences of the set is found, that event occurrence may be removed from the set. In this way, event occurrences that are not connected with other event occurrences of the set may be discarded so as to leave only events of the same event type. An amount of further processing required to identify a group of connected event may thus be reduced.

It is noted here that the method 10 may repeat the step 17 of analyzing the set of event occurrences and the event types of the event occurrences of the set so as to identify a second group of connected events of the same event type and employing the same resource. In this way, embodiments of the method 15 may identify a plurality of groups of connected events (employing of a common resource and being of the same event type). These groups may then be combined to create a parent (or 'super') group of related events employing the same resource (because they all stemmed from the identified set of event occurrence using the same resource identified in step 16 for example).

Parent groups (or 'super groups') of related events may therefore be created by embodiments, therefore enabling the provision of compacted or combined event information which can expanded (i.e. separated into sub-groups) in response to a signal (such as a user commend requesting expansion of the parent group for further investigation for example).

By way of further explanation, an exemplary embodiment will now be described in relation to a method wherein, as a result of the step 11 of identifying a group of related events, there is obtained information about events comprising primary keys such as event type, event time, event name/identifier. Completing the step 12 of identifying event types and associated resources may the provide information which may, for example, be represented in the form of a table such as Table 1 below, wherein each row relates to a different event and the primary keys are arranged in columns:

TABLE 1

| Event Type | NODE | ITMDISPLAYNAME |
|---|---|---|
| CPU THREADHOLD HIGH | MONITOR2 | MACHINE1 |
| DB TIME OUT | MACHINE1 | |

As will be appreciated from the exemplary table above, the information about the identified group of related events may comprise matches across multiple columns (i.e. in different data fields/columns). Accordingly, analysis of the information may face the problem that disparity in the monitoring system data formatting results in information about the resource(s) associated with events to be in different data fields/columns. For example, in Table 1 above, the resource "Machine 1" is associated with both the first event ("CPU THRESHOLD HIGH") and the second event ("DB TIME OUT"), but it is detailed in different data fields/columns for the two events.

For step 13 of identifying a set of event occurrences of the same event type, we may identify a set of event occurrences that are found to have an event type that is common to them. It may then be preferable to identify, within the set, event occurrences that do not have an associated resource that matches resource(s) of the other occurrences of the set and then remove such identified event occurrence from the set.

Then, for remaining event occurrences, the set may be analyzed to determine which data column/field to use. By way of example, this may comprise; firstly, identifying a resource that is associated with all event occurrences of the set, and then, secondly, analyzing the information data fields/columns to identify a data field containing the most instances of the identified resource. This may provide a pattern, e.g. a set of event type and resource pairs that match a related event group. Having identified a preferred data field/column, a group of connected events of common event type may then be identified based on the identified resource and the identified data field/column.

It will thus be appreciated that embodiments may implement a form of rule and/or data mining which utilizes information encoded event occurrences. Although embodiments may analyze a body or archive of event occurrences, they may provide information about connected events which may predict resource usage, constraints and/or impacts associated with event occurrences that have not previously occurred.

Event management systems lend themselves to event actions and life cycle and enrich events with additional information of the events. The disclosed embodiments may analyze the body of events that have been so enriched and by utilizing the information about the event occurrences, embodiments may identify connected events and provide information that is useful for handling future event occurrences (even if such event occurrences have not been seen before).

Although it has been detailed above that the step 11 of identifying a group of related events may employ an approach (such as an unsupervised learning algorithm for example), a description of an exemplary method that may be employed for step 11 will now be provided with reference to FIG. 2-5. This is purely by way of example and it is to be understood that other methods of identifying a group of related events may be employed by other embodiments.

Figure 2:
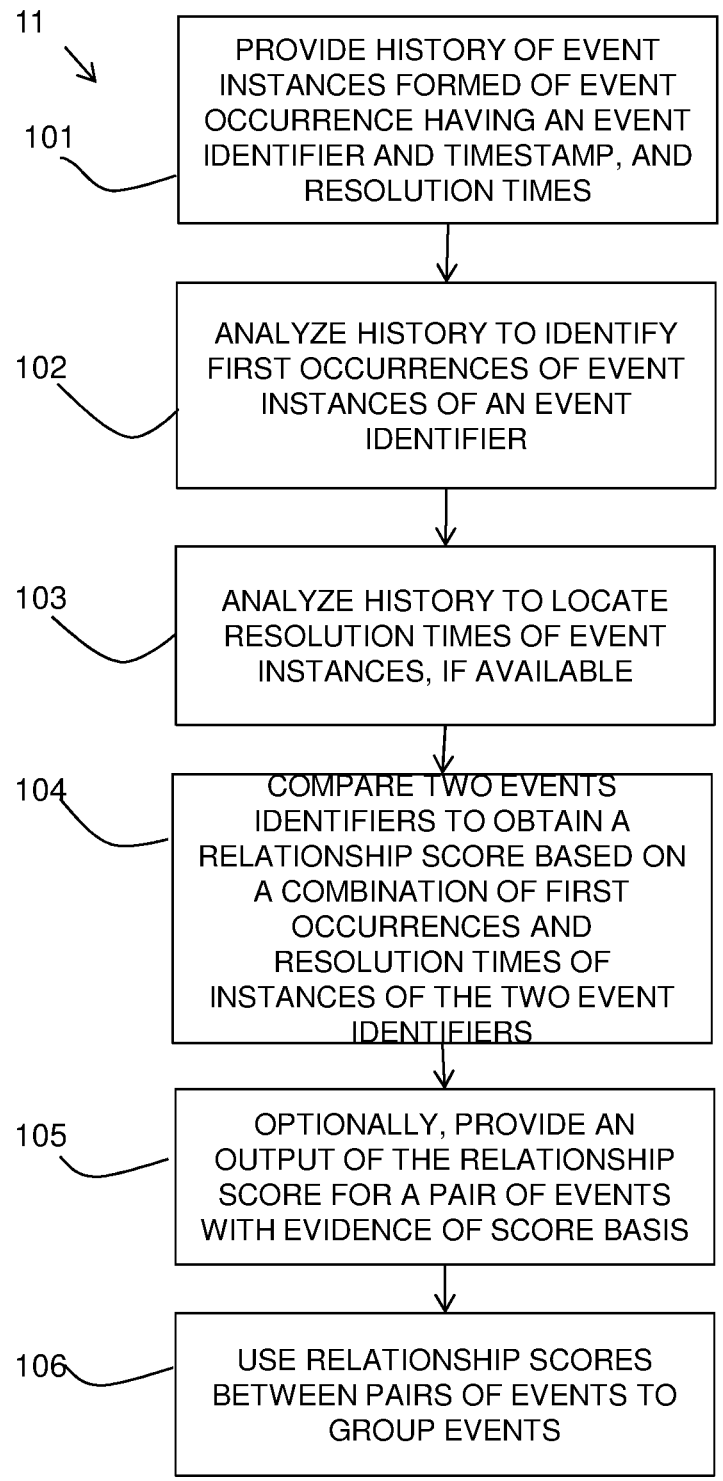
FIG. 2 is a flow diagram of an exemplary method for identify a group of related events which may be employed by the method of FIG. 1.

Referring to FIG. 2, the flow diagram 11 shows an example method for identifying a group of related events. The described method relies on analyzing a provided body 101 or archive of historical events that includes multiple event occurrences with each occurrence having an event identifier (which acts as a primary key) and a timestamp. The event identifier describes what has happened and to what devices. As an example, an event identifier may be "database fail on host A". The event identifier will occur multiple times across the data set, so for each event identifier there will be a list of event occurrences.

An event instance may be defined as being a group or cluster of occurrences in a time window relating to an event identifier, and an event instance may have a first occurrence and may have a resolution time (although in some instance this may not be available). For example, an event instance may represent a particular problem.

Event management systems provide historical data stores, where each event has a unique identifier that identifies its recurrence across time. As problems re-cur (event instances) they are attributed a first occurrence and these may either clear or be resolved with a resolution time. Each event identifier has multiple possible first occurrences and multiple possible resolution times across the historic archive.

The body of historical events may have event instance resolution times added to it or may be analyzed to extract resolution information. In some systems, resolution events are provided which may relate to one or more event identifier. The resolution events may include the event identifier to which they relate, or may require a mapping from a resolution identifier to event identifiers.

The body of historical events may be analyzed 102 to identify first occurrences of an event instance of an event identifier. A first occurrence may locate the first event occurrence with an event identifier after a threshold period of no event occurrences of the event identifier or after a previous resolution of event occurrences of the event identifier. A first occurrence identifies the start of a problem. There may be multiple first occurrences of an event identifier within the time period of the body of historical events.

The body of historical events may also be analyzed 103 to locate resolution times of an event identifier. To obtain resolution times of an event identifier, a resolution identifier may require mapping to event identifiers which it resolves. As discussed above, resolution times are not as reliable an indicator as first occurrence of an event identifier due to problems in accurate recording of event resolution.

As a starting point assume for each event identifier in the historic archive there is a list of occurrences and resolution times, as illustrated by FIG. 2 below:

TABLE 2

{
occurrences time of problem,
resolution occurrence time
}

As stated before, a resolution event can pertain to multiple events so naïvely passing it in does not work and analysis of the resolution events may be required.

Two event identifiers may be compared 104 by analyzing and scoring their event instances occurrences including both their first occurrences of instances and their resolution times of instances to obtain a relationship score between the two event identifiers. Due to the more reliable indications being the first occurrences, the first occurrences may be scored and these scores may be weighted by the resolution times when available. Put another way, the resolution times may be used to augment the scoring based on first occurrences.

There may be event occurrences relating to multiple event identifiers within a time window, and the method carries out a pair-wise analysis to test all possibilities, so that all event occurrences in a time window are compared.

An output of the relationship score may be provided 105 with evidence of the score basis. When relationships are discovered it is common for end users to wish to understand why there is a relationship. Therefore, at this point evidence of why the relation was uncovered (supporting pairs of first occurrences and used the supporting pairs of resolutions) may be presented to the end user.

The relationship scores between event identifiers may also be used 106 to group events. The grouping of events may be used by correlation rules and policies may be created from deployed correlation rules. The policies may then take action on real time events to group events for presentation of a reduced number of events to an operator.

Figure 3:
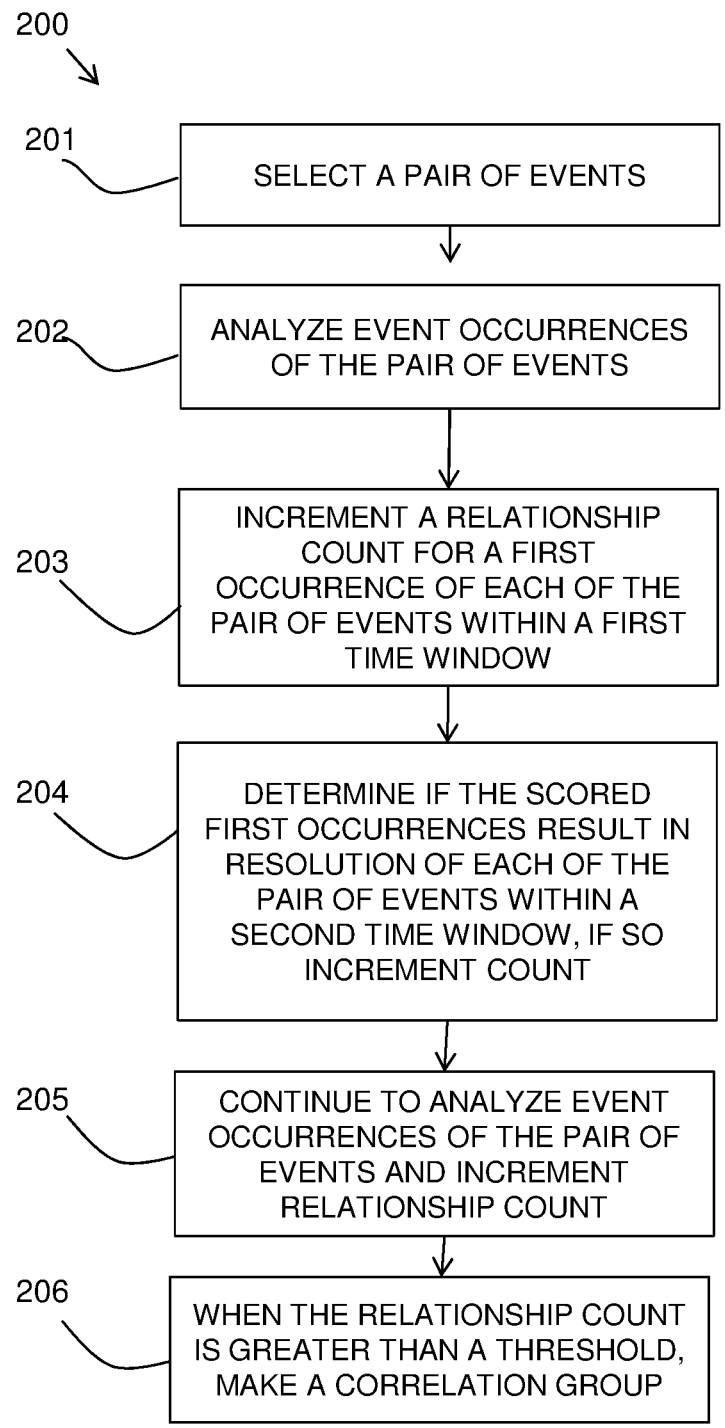
FIG. 3 is a flow diagram of a first example of an aspect of the method of FIG. 2, in accordance with one or more aspects of the present invention.
Figure 4:
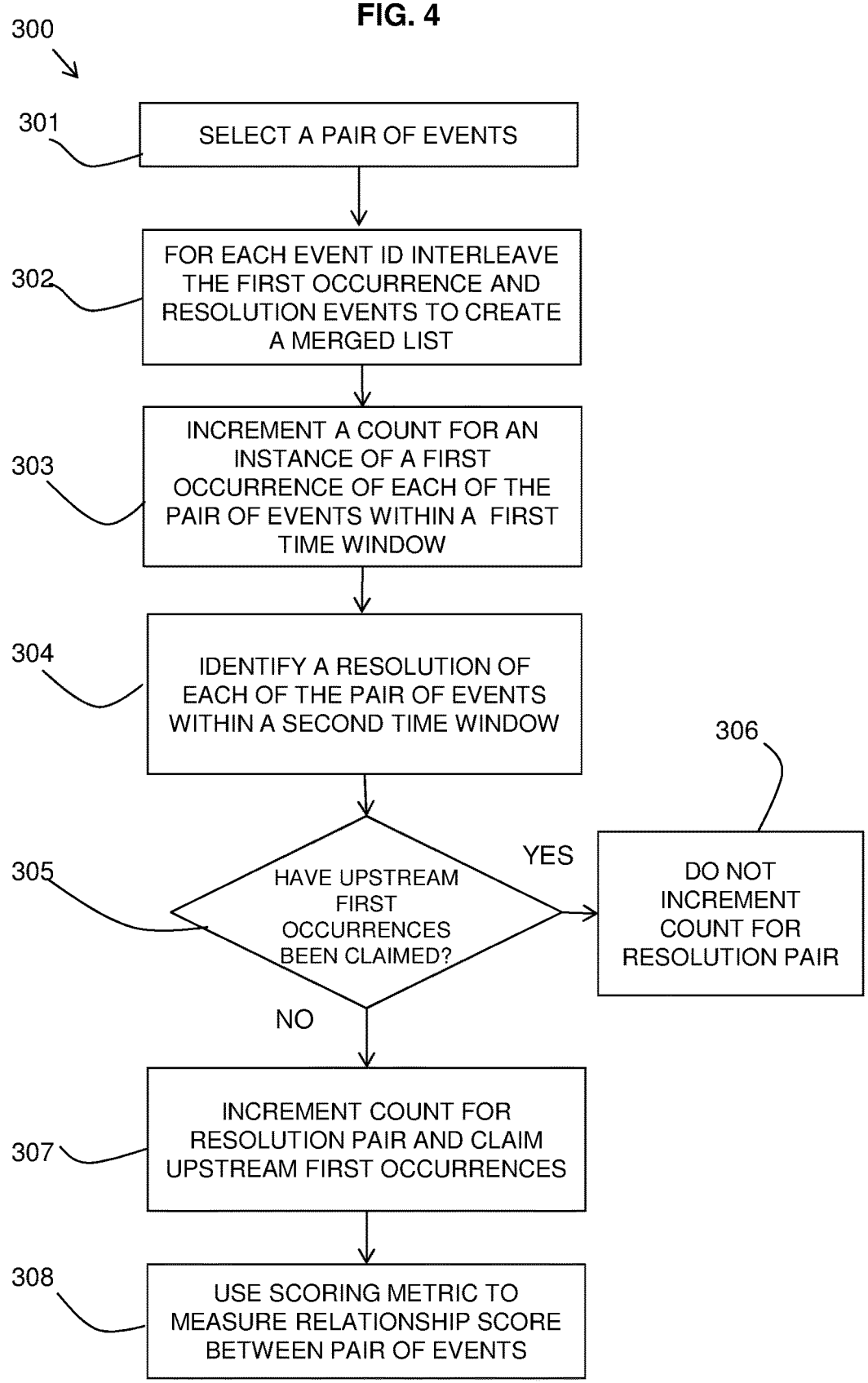
FIG. 4 is a flow diagram of a second example of an aspect of the method of FIG. 2, in accordance with one or more aspects of the present invention.
Figure 5:
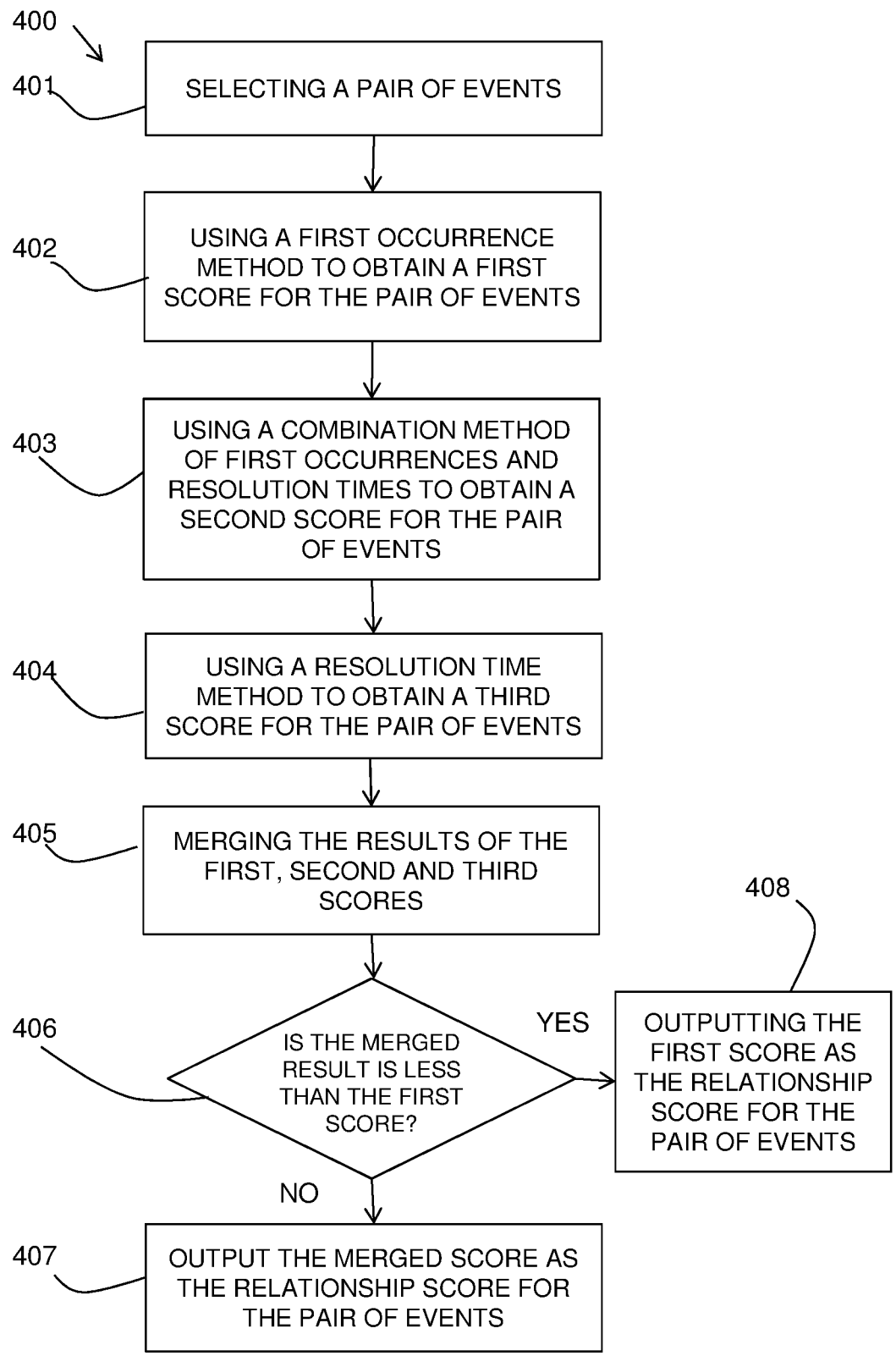
FIG. 5 is a flow diagram of a third example embodiment of an aspect of the method of FIG. 1, in accordance with one or more aspects of the present invention.

FIGS. 3, 4 and 5 show examples comparing two event identifiers by analyzing and scoring their event instances including both their first occurrence of instances and their resolution times of instances to obtain a relationship score between the two event identifiers.

Referring to FIG. 3, a flow diagram 200 shows a first example carried out for a pair of events selected 201 for analysis. The two events have event identifiers. The event occurrences in the body of historical events, which reference the two event identifiers, are analyzed 202.

First occurrences of an event instance of each of the selected event identifiers occurring within a first time window are identified and a relationship score for the pair of event identifiers incremented 203.

It may then be determined 204 if the scored first occurrences result in resolution of the two events within a second time window. It should be noted that the time window for event resolutions may be longer than the time window for first occurrences providing more leeway for event resolution to be recorded. If it is determined 204 that the scored first occurrences result in resolutions, then the relationship score may be incremented or increased by a given factor.

The event occurrences may be continued 205 to be analyzed for later first occurrences of event instances of the pair of events and possible resolution.

A threshold of a relationship score may be provided and when this threshold is reached, a correlation group may be formed 206 including the two event identifiers in the group. Additional relationship scores above the threshold between one of the event identifiers in the group and another new event identifier, enables the new event identifier to be added to the group.

Referring to FIG. 4, a flow diagram 300 shows a second example in which a pair of events may be selected 301 for analysis. The two events have event identifiers.

The event occurrences in the body of historical events, which reference the two event identifiers are analyzed. For each event identifier, first occurrences and resolution events are interleaved 302 to create a merged list of first occurrences and resolutions. First occurrences of an event instance of each of the selected event identifiers occurring within a first time window are identified and a score incremented 303.

Resolution of each of the pair of event instances within a second time window is identified 304. It may be determined 305 if the upstream first occurrences have been claimed as being resolved. If they have already been claimed, then the score is not incremented 306 for the instances of the resolution pair.

However, if the upstream first occurrence instances have not been claimed, the score for the instances of the resolution pair are incremented 307 and the upstream first occurrence instances are claimed as resolved. A scoring metric may be used 308 to determine the relationship score between the pair of events.

Referring to FIG. 5, a flow diagram 400 shows a third example of the aspect of comparing two event identifiers by analyzing and scoring their event instances including both their first occurrences of an instance and their resolution of the instance to obtain a relationship score between the two event identifiers. In this example, the combined scoring method is compared and augmented by a pure first occurrence method of relationship scoring and a pure resolution time method of relationship scoring.

A pair of events may be selected 401 for analysis. The two events have event identifiers. The event occurrences in the body of historical events, which reference the two event identifiers are analyzed.

A pure first occurrence method is used 402 to generate a first relationship score based on each pair of event identities and across all time that the events have occurred. This may be done using the following method indicated in table 3 below:

TABLE 3

If a pair of first occurrences from each event appear within a given window increment a co-occurrence count by one
Measure the strength of the relationship between the two event identities (A and B say) with a metric such as:
COUNT CO-OCCURRENCES OF A AND B / MAX(COUNT OCCURRENCES OF A, COUNT OCCURRENCES OF B)
If the measure exceeds a threshold infer a relation between these events.

A combined first occurrence and resolution time method may be used 403 as described in either of the methods of FIGS. 3 and 4 to generate a second relationship score. If the measure exceeds a threshold propose this measure strength in the merging step 405 below for consideration, along with the pairs that contributed to the increment in co-occurrence count. In other words, if a relationship score using the combined method is above a threshold strength, then it is a valid relationship.

A pure resolution time method is used 404 to generate a third relationship score based on each pair of event identities and across all time that the events have occurred.

Merge 405 the relationship strengths found by the pure first occurrence method 302, the combined first occurrence and resolution time method 403, and the pure resolution time method 304. In one embodiment, the merged relationship strength may be used as the output.

In another example, it may be determined if the merged result is less than that found by the pure first occurrence method 406 alone. If so, the score found by the pure first occurrence method 402 alone may be output 408. If the merged result is greater than that found by the pure first occurrence method 402 alone, the score found by the merged result may be output 407.

It may be that there are not enough observations to find a confidence the pure first occurrence or pure resolution time methods but due to the large count volume of the combined method, a confidence number may be found which is relayed to the user.

Given the infrequency of observation (problems in performance management domain) resolution times are not frequently recurring in nature, and so a selection of the maximum strength seen, i.e. max (402, 403, 404), may be used.

Figure 6:
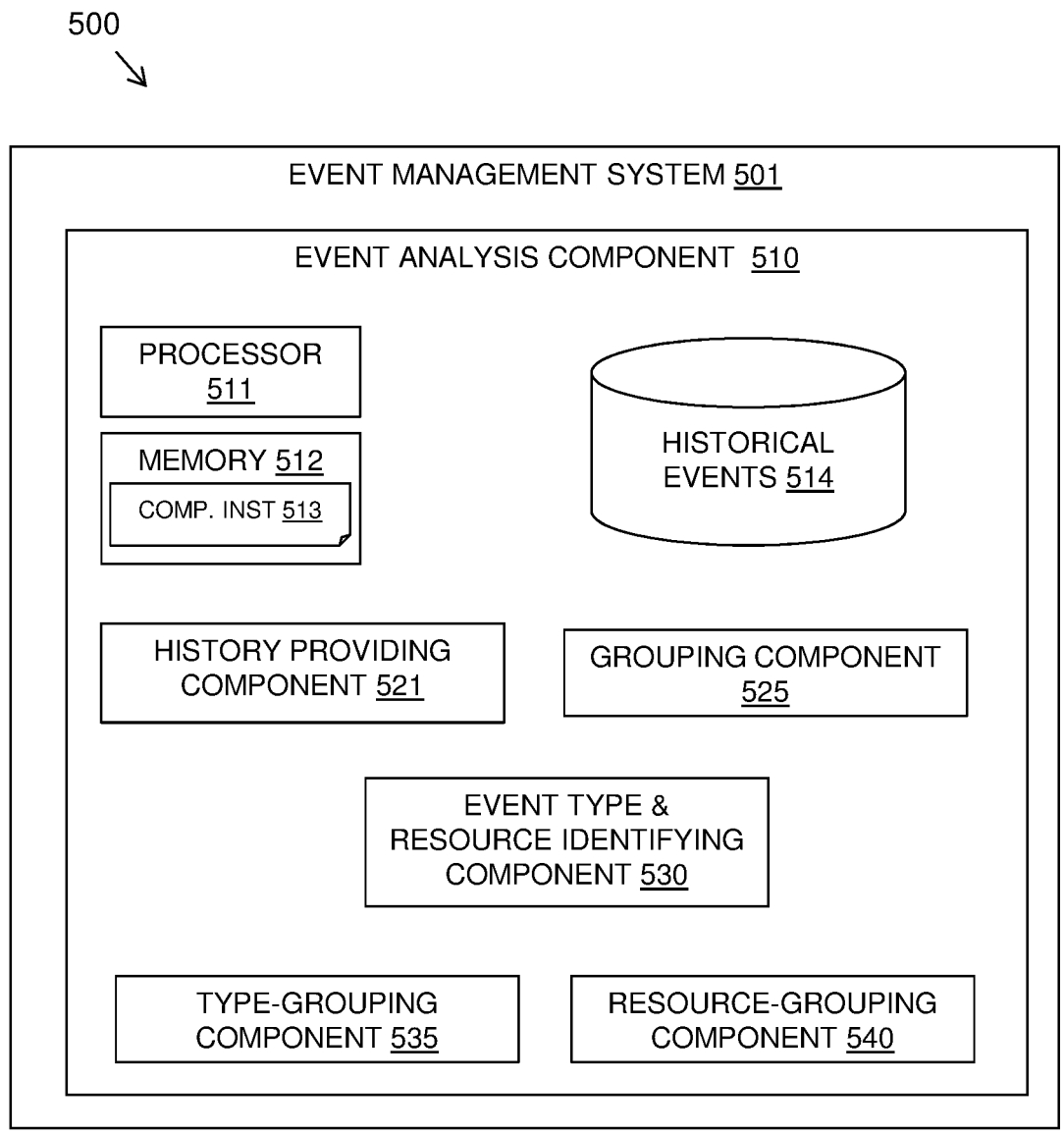
FIG. 6 is a block diagram of an example embodiment of a system, in accordance with one or more aspects of the present invention.

Referring to FIG. 6, a block diagrams 500 shows an example embodiment of an event management system 501 which include an event analysis component 510. The event management system 501 includes a related event analytic capability provided by the event analysis component 510 that learns relationships between events based on historical event data, which are presented as a set of groups which can be developed into correlation rules.

The event analysis component 510 include at least one at least one processor 511, a hardware module, or a circuit for executing the functions of the described components which may be software units executing on the at least one processor. Multiple processors running parallel processing threads may be provided enabling parallel processing of some or all of the functions of the components. Memory 512 may be configured to provide computer instructions 513 to the at least one processor 511 to carry out the functionality of the components.

The event analysis component 510 may be provided remotely as a service for event analysis to multiple systems. The event analysis component 510 may include or have access to a store of historical events 514 on which analysis is carried out.

The event analysis component 510 may include a history providing component 521 for providing a history of a plurality of event instances relating to multiple events with each event instance having an event identifier of one of the multiple events and a timestamp. The history identifies event recurrences over time.

The event analysis component 510 may include a grouping component 525 for grouping related events based on a history of a plurality of event instances relating to multiple events.

The event analysis component 510 may include an event type and resource identifying component 530 for identifying an event type and associated resources for event occurrences of a group of related events. Resources may, for instance, comprise one or more items or entities employed by a function or application such as: a hardware entity; software entity; data storage unit; memory resource; processor; physical component; virtual component; and the like.

The event analysis component 510 may also comprise a type-grouping component 535 for identifying a set or group of event occurrences of the same event type.

The event analysis component 510 may also comprise a resource-grouping component 540 for analyzing a set or group of event occurrences and associated resources to identify events being associated with the same resource(s).

Figure 7:
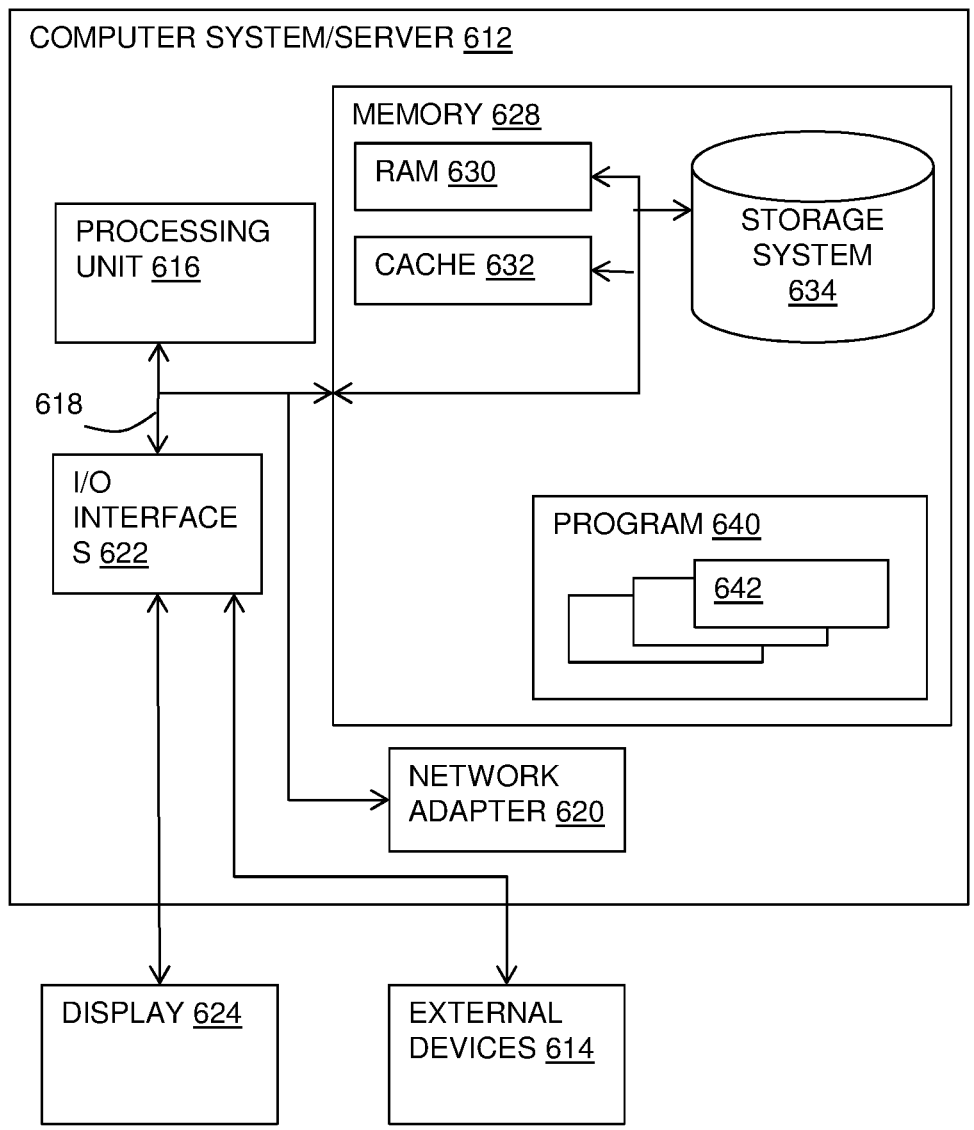
FIG. 7 is a block diagram of an embodiment of a computer system or cloud server in which one or more aspects of the present invention may be implemented.

Referring now to FIG. 7, a schematic of an example of a system 600 in the form of a computer system or server is shown.

A computer system or server 612 may be operational with numerous other general purpose or special purpose computing system environments or configurations. Examples of computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 7, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGURES illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
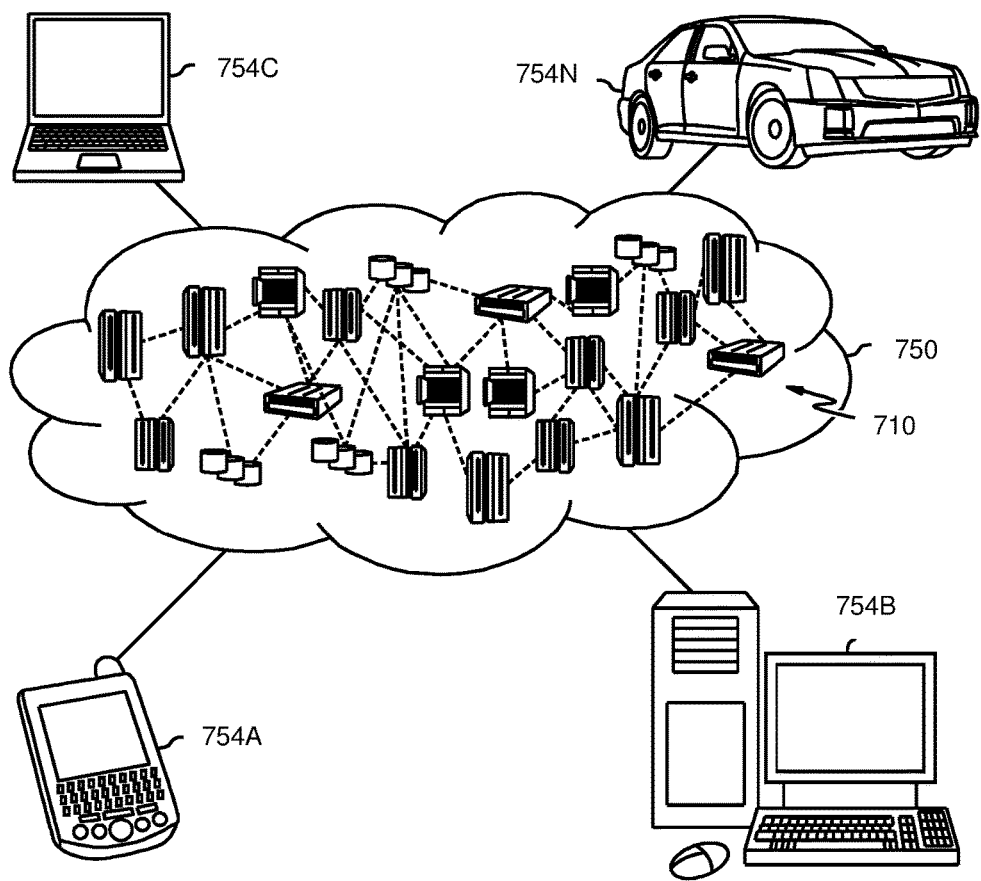
FIG. 8 is a schematic diagram of a cloud computing environment in which one or more aspects of the present invention may be implemented.

Referring now to FIG. 8, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 600 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 8 are intended to be illustrative only and that computing nodes 710 and cloud computing environment 750 can communicate with any type of computerized device over any type of network and/or network addressable connection (e.g., using a web browser).

Figure 9:
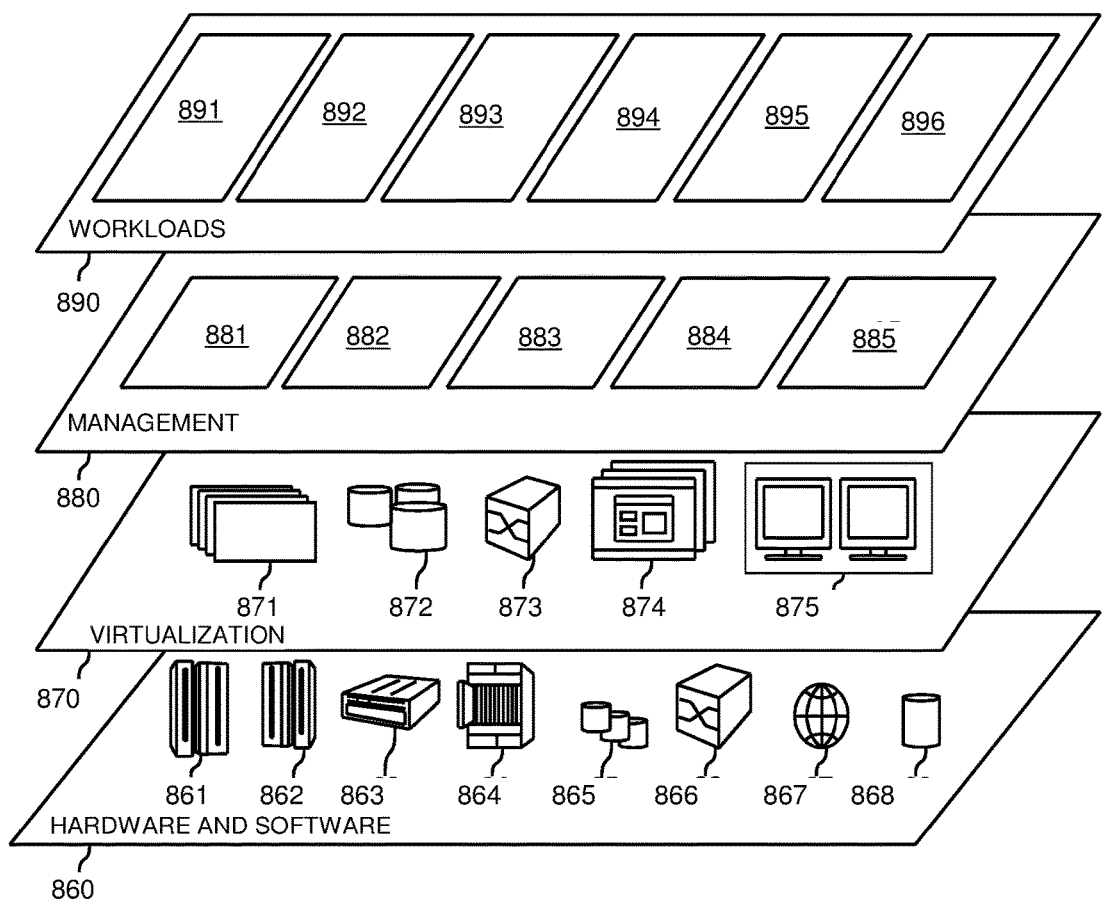
FIG. 9 is a diagram of abstraction model layers of a cloud computing environment in which one or more aspects of the present invention may be implemented.

Referring now to FIG. 9, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; and transaction processing 895; and event processing 895 including as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A computer-implemented method for event relationship analysis in fault management, the computer-implemented method comprising:
    identifying, by a computer, a group of related events based on a history of a plurality of event instances relating to multiple events;
    identifying, by the computer, an event type and one or more resources associated with an event occurrence from the group of related events;
    identifying, by the computer, a first set of event occurrences from the group of related events, wherein a plurality of the event occurrences of the first set is of the same event type; and
    identifying, by the computer, a first group of event occurrences of the first set of event occurrences, wherein each event occurrence of the first group is associated with the same resource, and the identifying of a first group of event occurrences includes:
        identifying an event occurrence that does not have an associated resource which is the same as the one or more resources associated with the remaining event occurrences of the first set of event occurrences, and removing the identified event occurrence from the first set of event occurrences.

2. The computer-implemented method of claim 1, wherein the one or more resources associated with each event occurrence are represented by information provided in a plurality of data fields, wherein identifying a first group of event occurrences comprises:
    identifying, by the computer, a resource that is associated with all event occurrences of the first set of event occurrences;
    analyzing, by the computer, the information provided in the plurality of data fields to identify a data field containing the most instances of the identified resource; and
    identifying, by the computer, a first group of event occurrences associated with the same resource based on the identified resource and the identified data field.

3. The computer-implemented method of claim 1, further comprising:
    identifying, by the computer, a second group of event occurrences of the first set of event occurrences, wherein each event occurrence of the first group is associated with the same resource; and
    combining, by the computer, the first and second groups of event occurrences to create a parent group of connected events having the same event type.

4. The computer-implemented method of claim 3, further comprising:
    in response to an expand command, separating the parent group of connected events into the first and second groups of event occurrences.

5. The computer-implemented method of claim 1, wherein the events are identified by event identifiers, wherein an event instance has one or more event occurrences referencing an event identifier, each event occurrence having a timestamp, and the history including the event occurrences and resolution event information, wherein identifying a group of related events comprises:
    analyzing, by the computer, the event occurrences relating to each event identifier to identify one or more first occurrence of an event instance;
    analyzing, by the computer, the resolution event information relating to each event identifier to identify any event resolution time for an event instance;
    comparing two event identifiers to obtain a relationship score between the two event identifiers, wherein the comparing is based on a combination of first occurrences of event instances relating to the two event identifiers and resolution times of the event instances; and
    creating, by the computer, a group of events that are related based on the relationship scores.

6. The computer-implemented method of claim 5, wherein comparing two event identifiers to obtain a relationship score includes:
    scoring, by the computer, a pair of a first occurrence of each event identifier occurring within a given time window; and
    augmenting, by the computer, the score based on resolution times of the event instances of the event identifiers.

7. The computer-implemented method of claim 5, wherein comparing two event identifiers to obtain a relationship score includes:
    identifying, by the computer, first occurrences of event instances of an event identifier and resolutions times of the event instances to create a list of timestamps for each event identifier; and
    analyzing, by the computer, the first occurrences and resolution times of two event identifiers to obtain the relationship score.

8. The computer-implemented method of claim 5, wherein comparing two event identifiers to obtain a relationship score includes:
    using, by the computer, a first occurrence method of scoring a pair of event identifiers to result in a first score;
    using, by the computer a combination of a first occurrence and a resolution time to score a pair of event identifiers to result in a second score;
    using, by the computer, a resolution time to score a pair of event identifiers to result in a third score;
    merging, by the computer, the results of the first, second and third scores; and
    outputting, by the computer, the merged score if it is not less than the first score.

* * * * *